June 24, 1930.  J. W. GARDNER  1,766,499

PUMP

Filed Feb. 1, 1927

INVENTOR
John W. Gardner
By
ATTORNEY.

Patented June 24, 1930

1,766,499

UNITED STATES PATENT OFFICE

JOHN W. GARDNER, OF QUINCY, ILLINOIS, ASSIGNOR, BY MESNE ASSIGNMENTS, TO GARDNER-DENVER COMPANY, A CORPORATION OF DELAWARE

PUMP

Application filed February 1, 1927. Serial No. 165,084.

My invention relates to pumps.

It has for its object to provide improved means whereby the flow of fluid along a pump piston rod is controlled in an improved manner. A further object of my invention is to provide improved connections especially adapted to use in connection with a mud pump, whereby the flow of slush along the piston rod is reduced, and wherein the slush is wiped from the rod, prevented from entering the crosshead bearings and the lubricating system, and caused to be discharged from the pump, all in an improved manner. A more specific object of my invention is to provide an improved slush wiping and discharging member functioning to wipe the slush from the piston rod and cause the discharge of the same from the pump in an improved manner while protecting the crosshead guides and the pump lubricating system from the entry of slush.

In the accompanying drawings I have shown for purposes of illustration, one embodiment which my invention may assume in practice.

In these drawings,—

In this illustrative construction, the invention is disposed between the cylinder 1 and the crosshead guide 2 of a pump and associated with a piston rod 3 operatively connected between the crosshead 4 and the pump piston (not shown), the same being located between the ends of the cylinder and of the crosshead guide and involving an improved construction hereinafter described.

Figure 1:
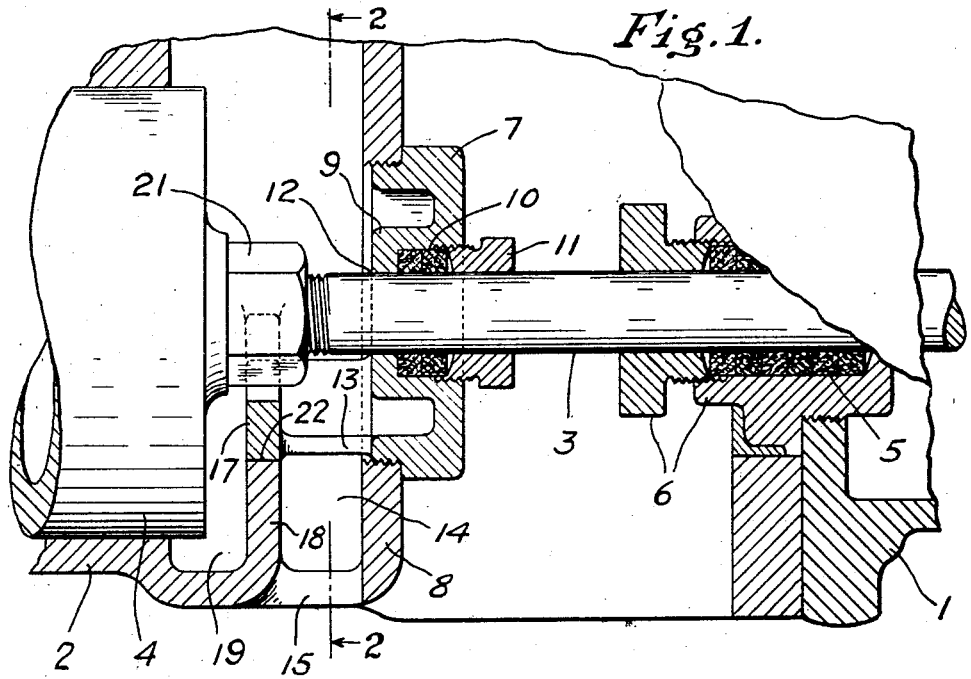
Fig. 1 is a partial longitudinal sectional view of a pump equipped with my improvements.
Figure 2:
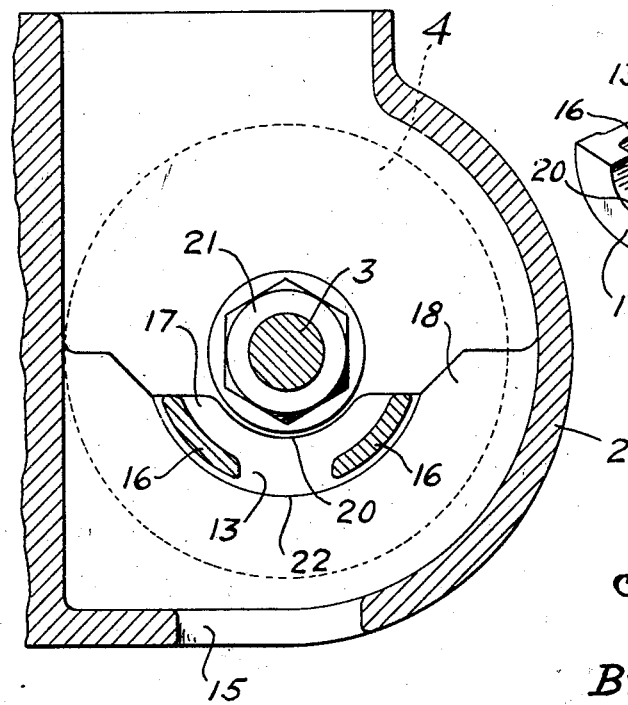
Fig. 2 is a transverse sectional view on line 2—2 of Fig. 1.
Figure 3:
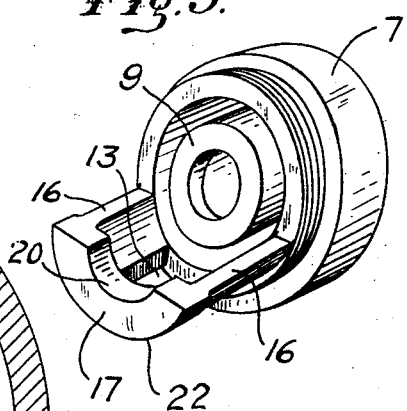
Fig. 3 is a perspective view of my improved wiping member.

In my improved construction, in addition to usual packing 5 disposed in a suitable gland connection 6 surrounding the rod 3 and located at the end of the cylinder 1, I provide, suitably spaced from these connections and between the same and the crosshead, improved slush controlling connections which function further to reduce the amount of slush finding its way along the rod 3, and further also act to wipe off any slush which does find its way along the piston rod, and to discharge this slush from the pump, thus preventing it from reaching the crosshead guides and the general lubricating system of the pump. Herein it will be noted that I have provided a member 7, preferably externally flanged, adapted to be suitably attached, as by threading, to an upstanding or septum member 8 carried on the frame, and suitably spaced from the packing gland 6 on the cylinder head. This member 7 herein also has an annular groove surrounding its inner wiping surface and forming internal sleeve or hub 9 which is in turn bored to permit the passage of the piston rod and provided at its outer end with a suitable surrounding packing bore 10 adapted to receive suitable packing and a gland 11 readily accessible in the open space between the same and the cylinder head. Herein, the sleeve 9 so fits the piston rod, as at 12, that, while permitting free movement of the latter, any slush passing through the two sets of packing is wiped off of the rod as the latter is withdrawn, i. e. moves to the right to the position indicated in Fig. 1.

To facilitate removal of this wiped off slush, I provide an opening 13 below the wiping edge 12 and a communicating chamber 14 inside the frame member 8 on the frame and leading downward to a bottom outlet 15 in the frame, and I also provide cooperating slush directing surfaces leading to this opening 13. In this construction, the aperture 13 is formed between two projections 16 on the under side of the member 7, and these projections 16 are disposed in an arc adjacent the lower end of the annular groove and so sloped toward the aperture 13 that, should any slush fall on them, it will also be discharged thereby through the aperture 13.

Here, attention is also directed to the fact that an upstanding transverse lip 17 is provided on a septum 18 which projects partway upward from the crosshead guide and serves to provide a lubricant pocket 19 at the end of the lower crosshead guide and space the same from the slush passages 13, 14 and 15, this lip 17 herein being so disposed as to prevent the entry of slush into the pocket 19 and the crosshead guide, and its resultant general distribution in the pump lubricating system, while still permitting free passage of the rod 3 and its usual connections to the crosshead. Herein, the projections 16 carry on their ends adjacent the crosshead, an arcuate connecting member forming the transverse lip 17 and having a concave upper edge 20 adapted to permit the free passage of the nut 21 connecting the piston rod to the crosshead, and also having a convex lower edge 22 resting upon a correspondingly shaped seat in the septum 18, the construction being such that the member 17 may be withdrawn bodily when desired.

Thus it will be observed that any slush which find its way through the packing 5 not only may be wiped off by the wiping action of the gland 6 or that of the gland 11 and fall out through the space between the cylinder and the wall 8, but that the packing held in position by the gland 11 also acts to prevent the passage of slush further along the rod. Should slush, however, pass through the means mentioned above, it will be wiped off on the edge 12 on the member 7 and flow down the latter member toward the outlet 15, the annular groove, surrounding the hub 9, then helping to keep any slush on that side of the passageway. Should any slush find its way laterally from the outlet 13, this will in turn be fed downward by the inner surfaces of the projections 16, while, should any slush find its way toward the crosshead side, it will be prevented from entering the crosshead guides, not only by the lip 17 on the member 7, which increases the effective height of the member 18, but by the body of the member 18. Thus it will be observed that not only is the passage of slush along the rod minimized, but any slush finding its way to the crosshead end of the rod is wiped therefrom at that point and so confined and directed by my improved construction that it cannot find its way into the crosshead bearings and the lubricating system of the pump, but, instead, is discharged from the pump at a point below the rod and crosshead, where it can do no harm.

Attention is also directed to the fact that in my improved construction, in addition to the advantages mentioned above, loss of oil through the slush discharge is also prevented by the portions 17 and 18 and there is no danger at any time of the slush passages being clogged, the passages being of ample size and so disposed as to permit free passage of the same for an indefinite time and also so accessible as to be capable of being readily cleaned from above whenever desired. It will also be evident that the construction may be very readily embodied in a pump, all of the parts shown in this illustrative construction other than the member 7 and the packing means associated therewith, being cast on the pump frame and certain of the parts of the latter also being capable of being formed on the pump frame, if desired, though the provision of the separate member 7 is preferred, the part 7 being of a type adapted to be readily and cheaply manufactured and readily inserted or removed if desired. These and other advantages of my improved construction will, however, be clearly apparent to those skilled in the art.

While I have in this application specifically described one embodiment which my invention may assume in practice, it will be understood that the invention may be modified and embodied in various other forms without departing from its spirit or the scope of the appended claims.

What I claim as new and desire to secure by Letters Patent is:

1. In a pump including a piston rod, a wiping member extending around said rod, and a frame supporting said wiping member presenting downwardly directed drain passages on opposite sides thereof external of the pump mechanism.

2. In a pump including a piston rod, a wiping member extending around said rod, and a frame supporting said wiping member presenting downwardly directed drain passages on opposite sides thereof, external of the pump mechanism, one of said passages having a septum between the same and one working end of the piston rod.

3. In a pump, a cylinder head, spaced septums spaced from said head having provision for piston rod movement relative thereto, and including a septum extending substantially into the path of the rod, and a wiper member for said piston rod carried by the other of said septums and discharging slush in the space between the same.

4. In a pump, a frame comprising spaced septums having provision for piston rod movement relative thereto and including a septum extending substantially into the path of the rod, a wiper member for said piston rod carried by the other of said septums and discharging slush in the space between the same, and slush deflecting means in said space carried by the wiper.

5. In a pump, a frame comprising spaced septums having provision for piston rod movement relative thereto, a wiper member carried by one of said septums discharging into the space therebetween, and means providing a wall forming a continuation of the other septum carried by the wiper and extending into adjacency to the path of the piston rod.

6. In a pump, a frame comprising spaced septums having provision for piston rod movement relative thereto, and a wiper member carried by one of said septums discharging therebetween and provided with a wall forming a continuation of the other, said member being provided between its body and said wall with a slush aperture below its wiping surface.

7. In a pump, a frame comprising spaced septums having provision for piston rod movement relative thereto, and a wiper member carried by one of said septums discharging therebetween and provided with a wall forming a continuation of the other, said member being provided between its body and said wall with portions tending to divert slush laterally.

8. In a pump, a cylinder, a crosshead guide, spaced septums spaced from the cylinder wall and one protecting the end of the crosshead guide and forming a lubricant chamber on one side of the same extending substantially above the latter, and a slush passage on the opposite side thereof, and a wiper member carried by the other of said septums and discharging slush into the space between said septums.

9. In a pump, a stationary frame presenting spaced septums and having a lubricant chamber on one side of one of the same and a slush passage on the opposite side thereof, and a wiper member carried by the other of said septums discharging slush into the space between said septums and carrying a continuation of said first mentioned septums.

10. In combination, a cylinder head, a crosshead guide spaced therefrom having an upwardly projecting lip at its end forming a lubricant pocket, a wall spaced from said lip and forming a slush passage therebetween, a crosshead movable in said guide and having a rod movable through said head, means forming a continuation of said lip extending into adjacency to said rod, and a rod wiper carried by said wall and discharging into said passage.

11. In combination, a crosshead guide having an upwardly projecting lip at its end forming a lubricant pocket and extending substantially into the path of the crosshead rod, a wall spaced from said lip and forming a slush passage therebetween, a crosshead movable in said guide and having a rod, and a rod wiper carried by said wall and having a wiper surface substantially coincident with the inner surface of said wall and discharging into said passage.

12. In combination, a crosshead guide having an upwardly projecting lip at its end forming a lubricant pocket, a wall spaced from said lip and forming a slush passage therebetween, a crosshead movable in said guide and having a rod, and a rod wiper carried by said last mentioned wall and discharging into said passage, said wiper having laterally spaced slush deflecting surfaces delivering to said passage.

13. In combination, a cylinder head, a crosshead guide, spaced therefrom and having an upwardly projecting lip at its end forming a lubricant pocket, a wall spaced from said lip and forming a slush passage therebetween, a crosshead movable in said guide and having a rod movable through said head, and a rod wiper carried by said last mentioned wall and discharging into said passage, said wiper carrying a wall spaced therefrom and forming a continuation of said lip.

14. In combination, a cylinder head, a crosshead guide spaced therefrom and having an upwardly projecting lip at its end forming a lubricant pocket, a wall spaced from said lip and forming a slush passage therebetween, a crosshead movable in said guide and having a rod movable through said head, and a rod wiper carried by said last mentioned wall and removable therethrough carrying means forming a continuation of said lip.

15. In combination, a cylinder head, a crosshead guide spaced therefrom and having an upwardly projecting lip at its end forming a lubricant pocket, a wall spaced from said lip and forming a slush passage therebetween, a crosshead movable in said guide and having a rod movable through said head, and a rod wiper carried by said last mentioned wall and removable therethrough carrying means forming a continuation of said lip and slush deflecting means leading to said passage.

16. A slush wiper for pumps comprising a wiper body adapted to permit the passage of a piston rod and having laterally spaced therefrom a projecting transverse lip and slush passage means between the same and said body.

17. A slush wiper for pumps comprising a wiper body adapted to permit the passage of a piston rod and having laterally spaced therefrom a projecting lip extending into adjacency to said rod, and slush passage means between the said lip and said body and slush deflecting means leading to said passage means.

18. A slush wiper comprising a wiper body having adjustable packing means adjustable from one side thereof and adapted to permit the passage of a piston rod, a transversely extending lip laterally spaced therefrom on the opposite side thereof and also adapted to permit piston rod passage and slush passage means between said lip and said body.

19. A slush wiper comprising a wiper body adapted to permit the passage of a piston rod, a transversely extending lip laterally spaced therefrom and disposed within the limits of said body and also adapted to permit piston rod passage and slush passage means between said lip and said body, said lip being connected to said body by spaced connecting members.

20. A slush wiper comprising a wiper body adapted to permit the passage of a piston rod and having a transverse lip spaced therefrom and extending into adjacency to but terminating short of the rod and slush passage means between the same and said body.

21. A slush wiper comprising a wiper body adapted to permit the passage of a piston rod and carrying packing and a packing gland accessible from one surface thereof and having on its opposite surface means forming a slush aperture and a laterally spaced transverse lip.

22. A slush wiper comprising a wiper body adapted to permit the passage of a piston rod and carrying packing and a packing gland in one surface thereof and having on its opposite surface means forming a slush aperture and a spaced lip, said lip being disposed within the limits of said wiper and removable bodily therewith.

23. In combination, a cylinder head, a crosshead guide spaced therefrom, a crosshead in said guide having a rod, wiper means for said rod adjacent the cylinder head, wiper means for said rod spaced therefrom and adjacent the end of said crosshead guide, and a septum between the end of said crosshead guide and said last mentioned wiper means, forming on one side means for confining the lubricant to the crosshead guide and on the other a slush passage discharging slush collected by that side of said last mentioned wiper means which is toward the crosshead guide.

24. In combination, a cylinder head, a crosshead guide spaced therefrom, a crosshead in said guide having a rod, wiper means for said rod adjacent the cylinder head, wiper means for said rod spaced therefrom and adjacent the end of said crosshead guide, and a septum between the end of said crosshead guide and said last mentioned wiper means forming on one side means for confining the lubricant to the cross head guide and on the other a slush passage, discharging the slush collected by the side of said last mentioned wiper means which is toward the crosshead guide, said septum extending upward into adjacency to said piston rod.

25. In combination, a cylinder head, a crosshead guide spaced therefrom, a crosshead in said guide having a rod, wiper means for said rod adjacent the cylinder head, wiper means for said rod spaced therefrom and adjacent the end of said crosshead guide, a septum between the end of said crosshead guide, and said last mentioned wiper means forming on one side means for confining the lubricant to the crosshead guide and on the other a slush passage, and means removable with said last mentioned wiper means, forming a part of said septum, and extending to a point adjacent said piston rod.

26. In combination, a cylinder head, a crosshead guide spaced therefrom, a crosshead in said guide having a rod, wiper means for said rod adjacent the cylinder head, wiper means for said rod spaced therefrom and adjacent the end of said crosshead guide, a septum between the end of said crosshead guide, and said last mentioned wiper means, forming on one side means for confining the lubricant to the crosshead guide and on the other a slush passage, and means removable with said last mentioned wiper means forming a part of said septum and extending to a point adjacent said piston rod and provided with slush deflecting surfaces leading to said passage.

27. In a pump, a crosshead guide, a crosshead including a rod and a pluraliy of spaced septums adjacent the end of the crosshead guide, the nearer septum protecting the crosshead and the other carrying wiper means on each face thereof cooperating with the crosshead rod, and a slush drain on each side of the latter septum removing the wiped off slush.

28. In a pump, a cylinder head, a crosshead guide, a crosshead including a rod movable through said head, a packing gland for the rod carried by the cylinder head, spaced septums external to and spaced from the cylinder head and adjacent the end of the crosshead guide, said septums forming a slush discharge drain between them and one of the same carrying a wiper acting on said rod and delivering to said drain and the other inhibiting the passage to the crosshead guide of slush wiped off by said wiper.

29. In a pump, a piston rod, means presenting spaced septums including a septum extending substantially into the path of the piston rod, and a wiper member for said rod carried by the other septum and having a groove adjacent a wiping surface thereof delivering slush into the space between said septums.

30. In a pump, a piston rod, means presenting spaced septums including a septum extending substantially into the path of the piston rod, a wiper member for said rod carried by the other septum and having an annular groove surrounding the wiping surface thereof delivering slush into the space between said septums, and slush deflecting means in said space adjacent the lower end of said groove.

31. A slush wiper comprising a body adapted to permit the passage of a piston rod and having therein a groove around a portion of its wiping surface.

32. A slush wiper comprising a body adapted to permit the passage of a piston rod and having therein an annular groove around its wiping surface.

33. A slush wiper comprising a body adapted to permit the passage of a piston rod and having therein an annular groove around its wiping surface and slush deflecting means adjacent the lower end of said groove receiving and guiding away slush wiped off by said surface.

34. In combination, a crosshead guide, a crosshead having a rod, a wiper for said rod adjacent the end of said guide, and means for preventing the mixture of slush with the crosshead lubricant including provision for draining away out of the path of the lubricant the slush wiped off by the opposite faces of said wiper as the rod moves in opposite directions.

35. In combination, a cylinder head, a crosshead guide spaced therefrom, a crosshead therein having a rod extending into the cylinder through said head, two wipers, one for the cylinder head and the other adjacent the crosshead guide, and slush discharging means discharging out of the path of the crosshead lubricant the slush collected by that face of the latter wiper which is toward the crosshead guide.

36. In combination, a cylinder head, a crosshead guide spaced therefrom, a crosshead therein having a rod extending into the cylinder, two wipers, one for the cylinder head and the other adjacent the crosshead guide, and means for preventing mixture with the crosshead lubricant of slush collected by that face of the latter wiper which is toward the crosshead guide.

37. In combination, a cylinder head, a crosshead guide spaced therefrom, a crosshead therein having a rod extending into the cylinder, two wipers, one for the cylinder head and the other adjacent the crosshead guide, and means for preventing mixture with the crosshead lubricant of slush collected by that face of the latter wiper which is toward the crosshead guide, including provision for drawing off said slush.

38. A slush wiper comprising a body adapted to permit the passing of a piston rod and having in one face thereof a groove around a portion of its wiping surface and a gland seated in its opposite face.

In testimony whereof I affix my signature.

JOHN W. GARDNER.